No. 873,884. PATENTED DEC. 17, 1907.
J. I. MORGAN.
WAGON RACK FASTENER.
APPLICATION FILED JUNE 10, 1907.
2 SHEETS—SHEET 1.
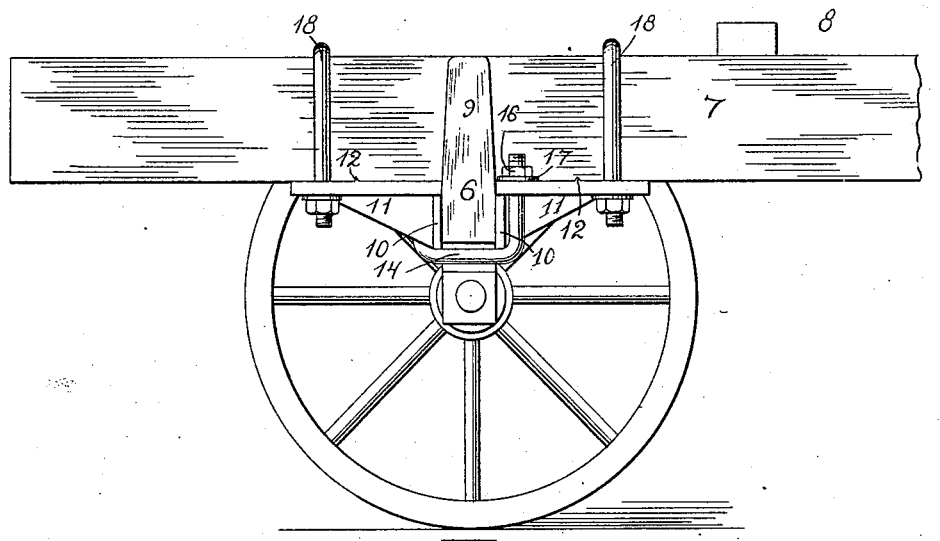
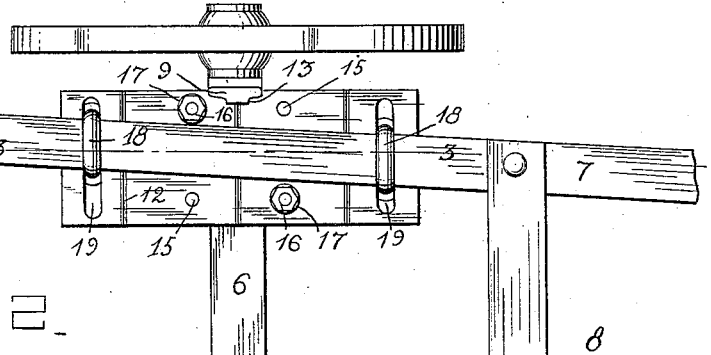
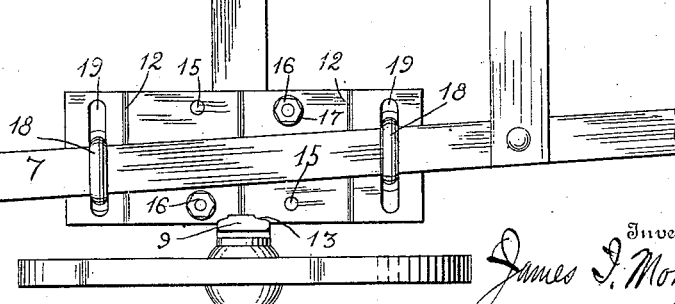
Witnesses
J. Milton Jester
D. L. Nash
Inventor
James I. Morgan
By
Watson E. Coleman
Attorney No. 873,884. PATENTED DEC. 17, 1907.
J. I. MORGAN.
WAGON RACK FASTENER.
APPLICATION FILED JUNE 10, 1907.
2 SHEETS—SHEET 2.
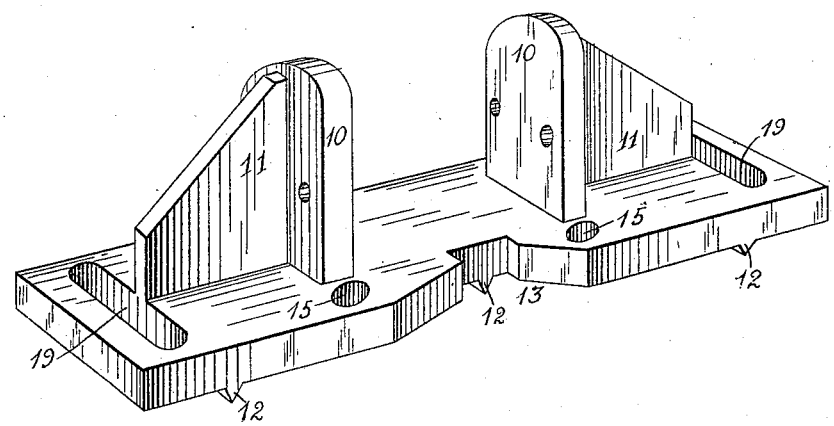
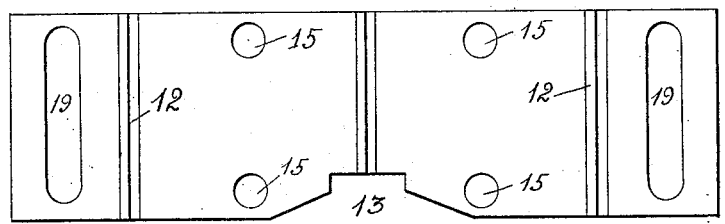
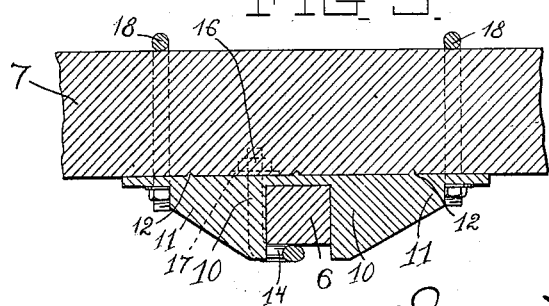
Witnesses
J. Milton Jester
D. L. Nash.
Inventor
James I. Morgan
By Watson E. Coleman
Attorney

UNITED STATES PATENT OFFICE.

JAMES I. MORGAN, OF DWIGHT, KANSAS.

WAGON-RACK FASTENER.

No. 873,884.	Specification of Letters Patent.	Patented Dec. 17, 1907.

Application filed June 10, 1907. Serial No. 378,311.

*To all whom it may concern:*

Be it known that I, JAMES I. MORGAN, a citizen of the United States, residing at Dwight, in the county of Morris and State of Kansas, have invented certain new and useful Improvements in Wagon-Rack Fasteners, of which the following is a specification, reference being had therein to the accompanying drawing.

My invention relates to improvements in devices for securing hay racks, wagon bodies and the like, upon the running gears of wagons.

The object of the invention is to provide a simple and inexpensive fastening device by means of which a rack may be quickly and easily secured upon the wagon bolsters so that it will be prevented from slipping longitudinally either forwardly or rearwardly and also from shifting laterally.

A further object of the invention is to provide a device of this character adapted for application to wagons and wagon racks of various kinds and sizes.

With the above and other objects in view, the invention consists of the novel construction and the combination of parts hereinafter described and claimed, and illustrated in the accompanying drawings, in which Figure 1 is a side elevation of my improved fastening or coupling plate, showing the same in use; Fig. 2 is a top plan view of the parts shown in Fig. 1; Fig. 3 is a detail section on the plane indicated by the line 3—3 in Fig. 2; Fig. 4 is a perspective of the fastening plate, looking toward its under side; and Fig. 5 is a top plan view of the same.

While my improved fastening or coupling device may be used for connecting a rack or body of any description upon the running gear of a wagon or other vehicle, I have, in the drawings illustrated two of the devices applied to the rear bolster 6 of a wagon and arranged to connect with the side bars or stringers 7 of a rack 8. Each of said devices is in the form of a plate of substantially rectangular form provided upon its bottom with depending arms or projections 10 spaced a sufficient distance apart to receive the bolster 6 between them. The arms 10 extend transversely of the plate so that the latter, when applied to the bolster, extends longitudinally of the wagon and is adapted to have one of the stringers or side bars 7 of the rack rest upon its top. The device is preferably, but not necessarily, cast in one piece and the arms or projections 10 are reinforced and strengthened by centrally disposed webs or braces 11. Upon the flat top of the plate I preferably form one or more transversely extending ribs 12 having sharp upper edges to bite the bar 7 and prevent the latter from slipping longitudinally upon the device. If desired, I may also form in one side of the plate at its center a recess or seat 13 to receive one of the standards 9 so that the device may be adjusted close to the outer end of the bolster.

For the purpose of securing the device to the bolster, I preferably employ a clip 14 in the form of a substantially U-shaped bolt which is arranged diagonally upon the bottom of the bolster and has its upwardly extending threaded arms passed through vertical apertures 15 formed in the plate. Clamping nuts 16 and washers 17 are arranged upon said ends of the bolt or clip so that the device may be securely clamped to the bolster. To permit the plate to be used upon either end of the bolster and also to permit two of the clips 14 to be used, I form in the plate two sets of openings 15, as clearly shown in Fig. 5. I also preferably employ U-shaped bolts or clips 18 for securing the bars 7 upon the top of the device. These bolts 18 straddle the bars 7 and have their threaded arms or ends projecting through transverse slots 19 formed in the ends of the plate and provided with washers and nuts similar to the bolts or clips 14. The slots 19 are made comparatively long and the plate is made comparatively wide so that the bar 7 of the rack can be adjusted transversely or laterally by shifting the bolts or clips 18 in said slots. This construction also enables the device to receive racks of different widths and racks which have their side bars 7 converging in a forward direction as the rack illustrated in the drawing.

From the foregoing it will be seen that the plate forms a simple, inexpensive and practical device by means of which the bars of a wagon rack or the like may be adjustably coupled or secured to the bolster of a wagon so that it will be impossible for the rack to slip forwardly or rearwardly in a longitudinal direction or to shift laterally or sidewise. The use of the U-shaped bolts or clips permits the coupling or fastening plate to be secured to bolsters of different sizes and also enables racks of various kinds to be fastened to the device.

Having thus described my invention what I claim and desire to secure by Letters Patent is:—

1. A coupling or fastening device of the character described, comprising a plate having transverse slots adjacent to its ends and apertures on opposite sides of its transverse axis, transverse ribs upon the upper face of said plate and depending arms or projections upon the bottom face of said plate, substantially as and for the purpose set forth.

2. A coupling or fastening device of the character described comprising a plate having transverse slots adjacent to its ends and apertures on opposite sides of its transverse axis, and clamping devices engaged with said slots and apertures for the purpose set forth.

3. A coupling or fastening device of the character described, comprising a plate having transverse slots adjacent to its ends and apertures on the opposite sides of its transverse axis, means upon the upper face of said plate to prevent a beam engaged therewith from slipping longitudinally thereon, means upon the bottom face of said plate to engage a beam or bolster and prevent the same from slipping longitudinally of said plate and U-shape clips engaged with the slots and apertures in said plate for the purpose set forth.

4. The combination with cross beams or bars, of an interposed coupling plate formed with transverse slots, a clamp securing one of said beams or bars to said plate and clamps engaged with the other beam or bar and arranged in the slots in said plate to secure said beam or bar to the latter and to enable it to be adjusted thereon, substantially as and for the purpose set forth.

5. The combination with cross beams or bars, of an interposed coupling plate, means for securing said plate to one of the beams or bars and means for securing the other beam or bar to said plate whereby it may be adjusted transversely and angularly upon said plate, substantially as described.

In testimony whereof I hereunto affix my signature in presence of two witnesses.

JAMES I. MORGAN.

Witnesses:
C. E. HAMPTON,
LANSON WOODWORTH.